UNITED STATES PATENT OFFICE.

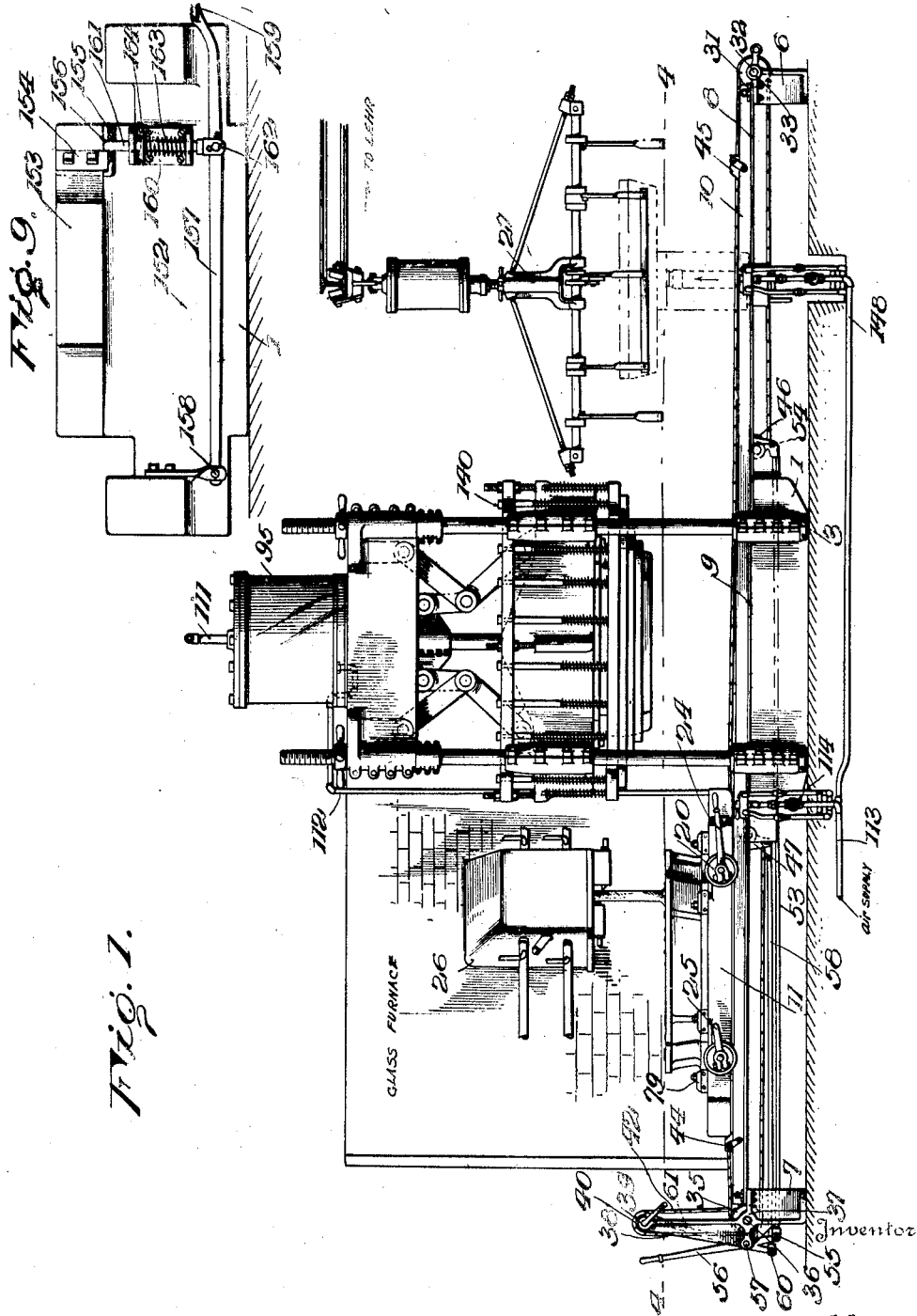

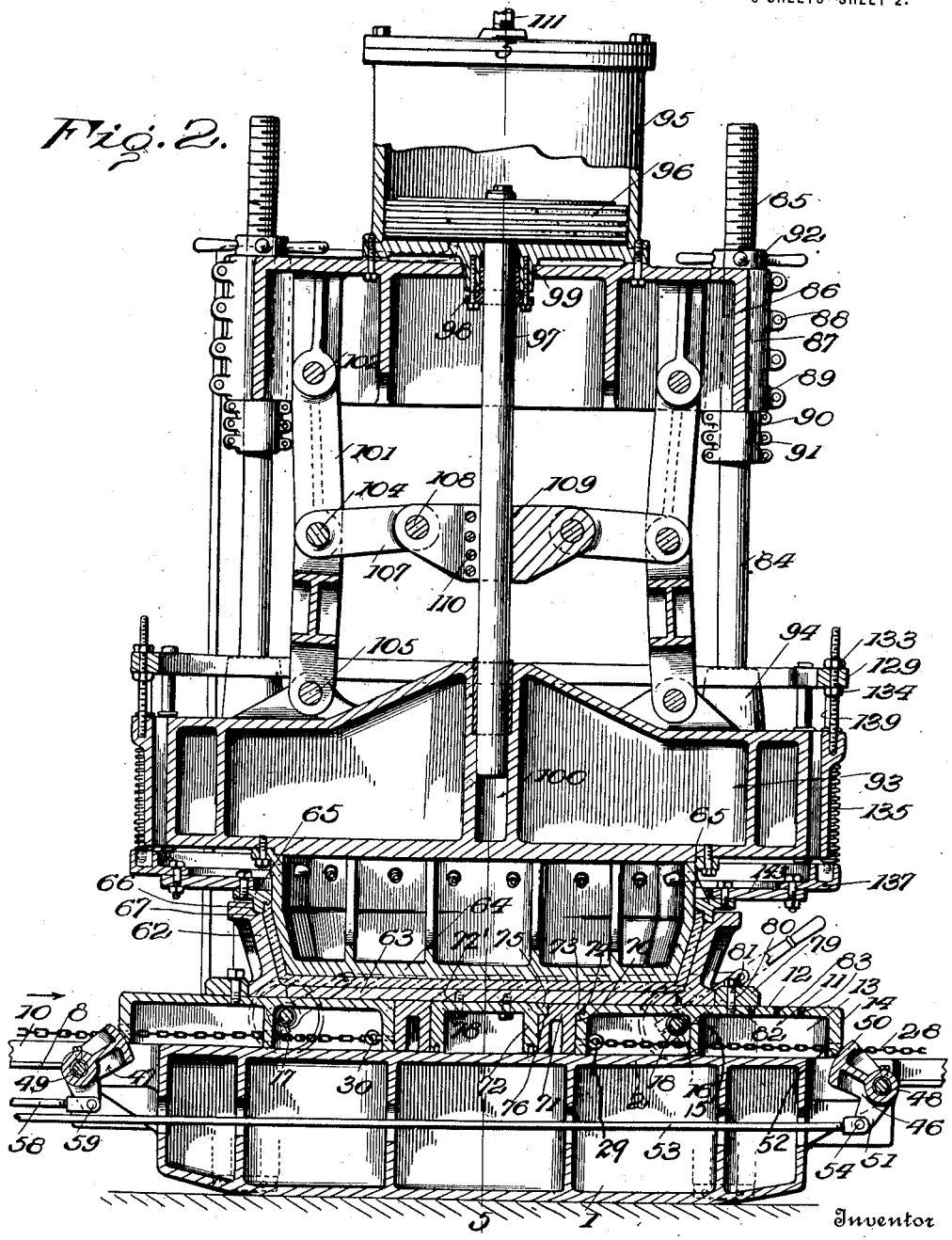

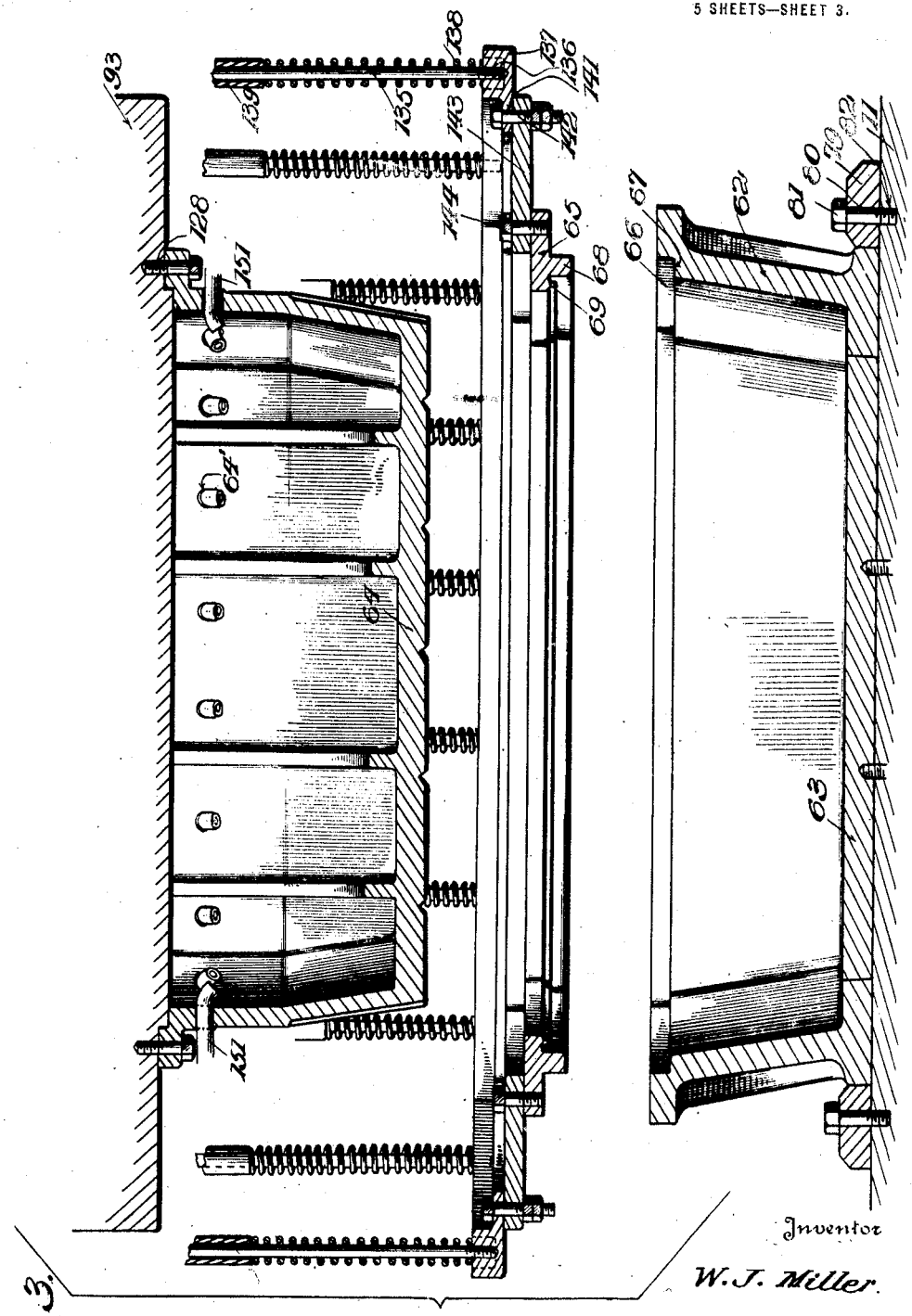

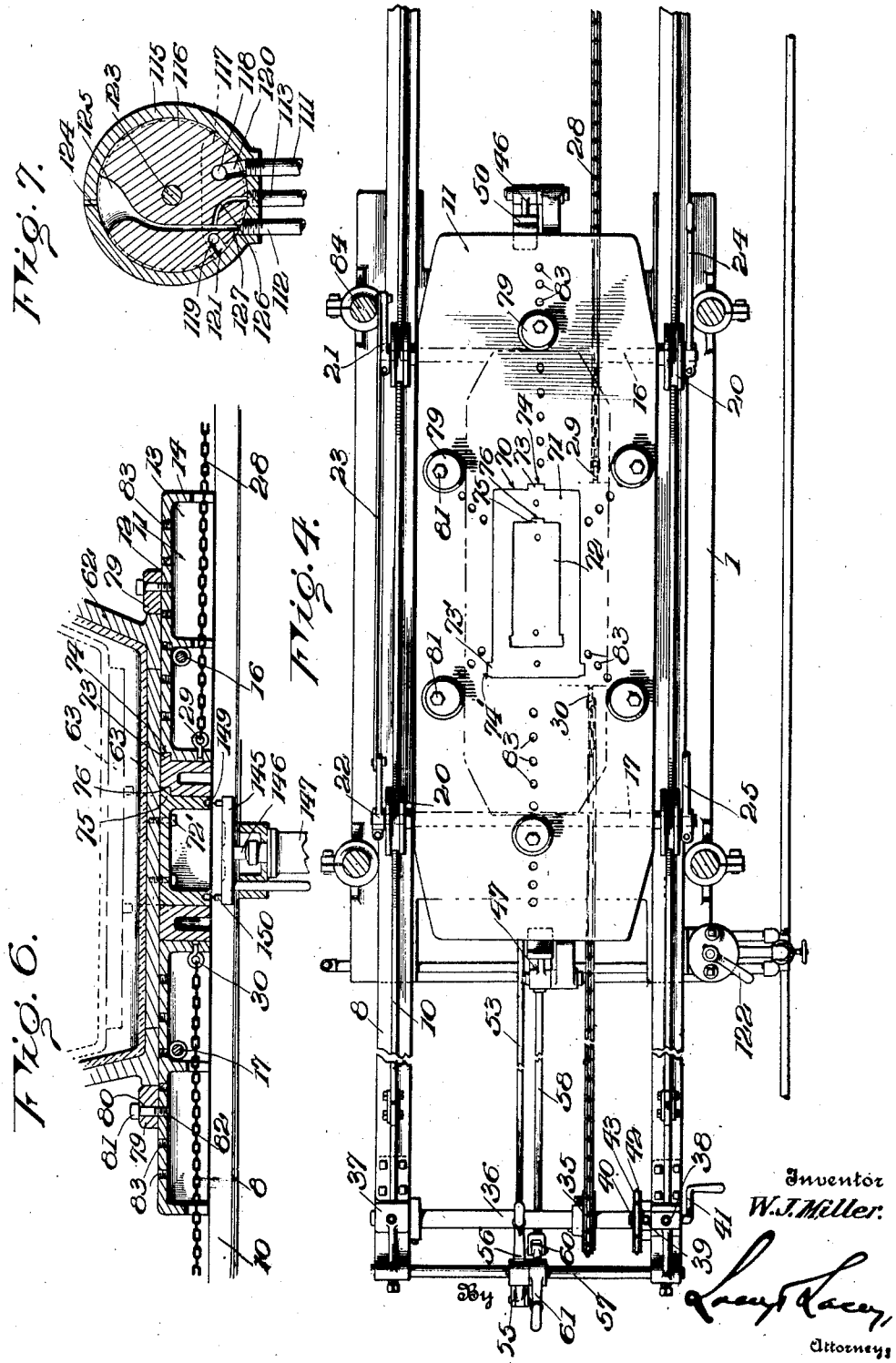

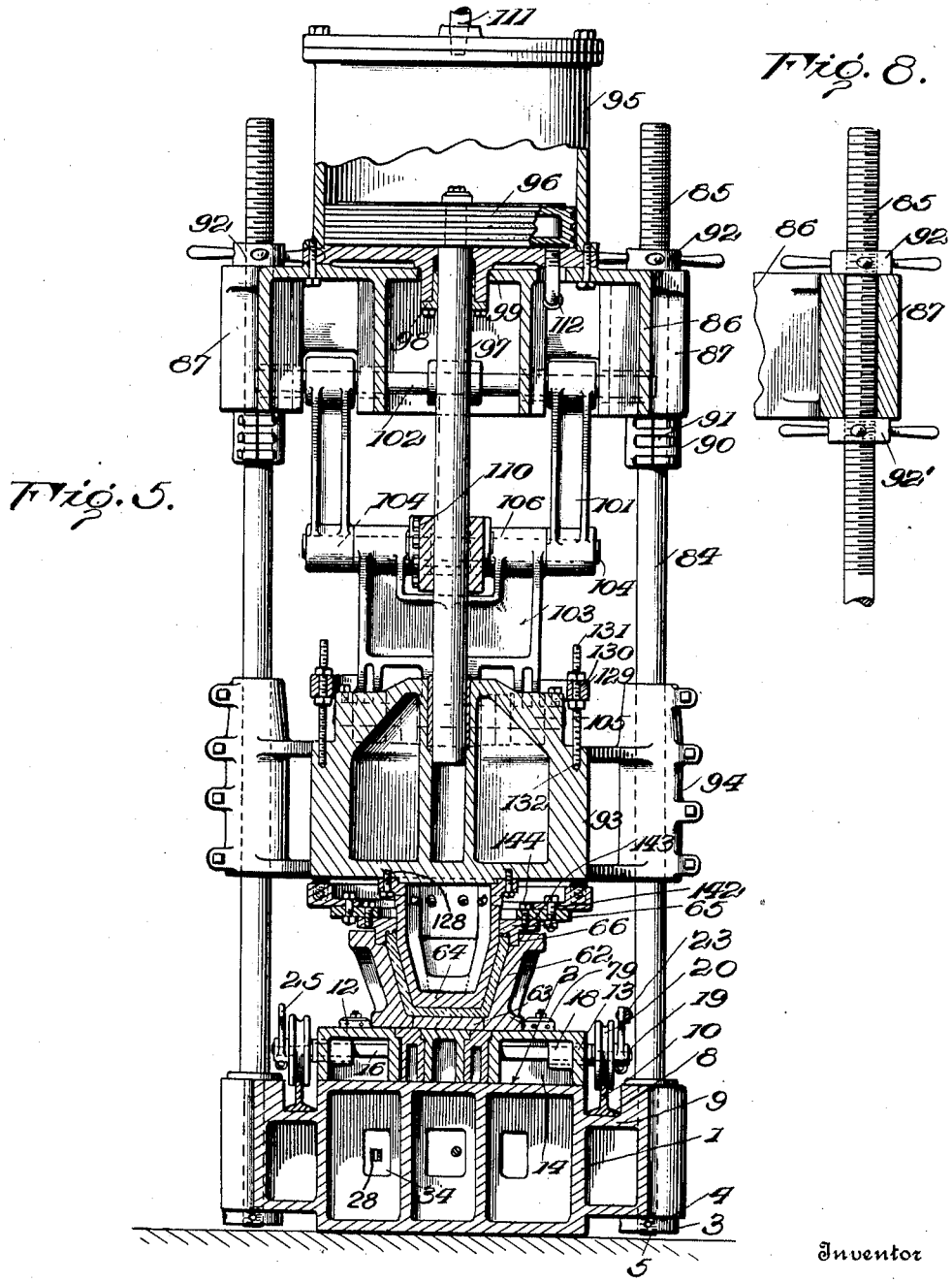

WILLIAM J. MILLER, OF SWISSVALE, PENNSYLVANIA.

MOLD-PRESS.

1,326,765.  Specification of Letters Patent.  Patented Dec. 30, 1919.

Application filed June 17, 1918. Serial No. 240,481.

*To all whom it may concern:*

Be it known that I, WILLIAM J. MILLER, a citizen of the United States, residing at Swissvale, in the county of Allegheny and State of Pennsylvania, have invented certain new and useful Improvements in Mold-Presses, of which the following is a specification.

This invention relates to mold presses and has as its object to provide a press designed for employment in conjunction with a mold chamber and a core for use in the production of articles molded from plastic material. While the press embodying the present invention is adapted for use in connection with various molds, it is designed more especially for use in connection with a mold designed for the production of glass caskets such as illustrated and described in Patent No. 1,211,684 issued January 9, 1917, to James W. De Camp. In the molding of casket shown in the patent to De Camp and in the use of the mold illustrated in the accompanying drawings, a quantity of molten glass is introduced into a mold chamber, a cap ring is held against the top of the mold chamber, and a core is forced downwardly into the mold chamber to mold the interior of the casket body or lid as the case may be, and force the molten glass up between the walls of the mold chamber and the sides of the core until it reaches the said cap ring, which ring is of such conformation as to suitably mold the upper edge of the body of the casket or the lower edge of the lid of the casket depending upon whether the mold itself is adapted for the production of the body or the production of the lid. Furthermore, the said mold embodies a separable bottom section which is designed to be elevated or forced upwardly within the mold chamber so as to discharge or eject the molded body or lid of the casket from the said chamber after the core and cap ring have been withdrawn.

One of the primary objects of the present invention is to provide a mold press including means for supporting the core of the mold, and capable of exerting great downward pressure thereagainst to act upon the mass of molten glass contained within the mold chamber, the core supporting and acting means coacting with means for lowering the cap ring into place upon the mold chamber prior to entrance of the core into the said chamber and for maintaining the said cap ring in position during the pressing operation and retracting the same subsequent to retraction of the core.

A further object of the invention is to provide upon the bed of the press, a mold chamber supporting platform movable along the bed to position to receive the charge of molten glass, to position for the carrying out of the pressing operation, and, to position where the separable bottom section of the mold chamber may be acted upon to discharge or eject the molded body or lid of the casket, as the case may be.

The invention has as a further object to provide means operable in the last-mentioned position of the mold chamber supporting platform, for moving or elevating the said separable bottom section of the mold chamber in a manner to eject the molded article from the said chamber.

Another object of the invention is to so construct the press that the mold chamber supporting platform may be shifted from one to another of its several positions with the exertion of but little energy and to further provide means whereby the said platform may be accurately positioned at the proper points in its travel over the bed of the press.

The mold chamber supporting platform is mounted for travel upon the bed by providing the said platform with wheels which travel over spaced rails upon the said bed, and it is a further object of the invention to so mount the spindles for the said wheels that they may be adjusted to permit the platform to lower to position resting squarely and firmly upon the press bed when the platform is, for example, in position for the carrying out of the pressing operation.

A still further object of the invention is to provide means operable to engage the opposite ends of the mold chamber supporting platform and hold the same firmly against displacement along the press bed and accurately positioned when the platform is in place for the operation of the core supporting and moving plunger of the press so that the plunger will be caused to enter the mold chamber in accurately centered relation thereto.

Another object of the invention is the provision of means upon the core supporting plunger head for supporting the cap ring of the mold in such a manner as to permit the said ring to seat upon the top of the mold chamber and be firmly held in place thereon as the core is lowered into the said chamber, the supporting means for the said cap ring being so constructed as to not interfere with the continued downward movement of the plunger head after the ring has been brought into position resting upon the top of the mold chamber.

A further object of the invention is the provision of means adapted for the support of cap rings of various dimensions so that with a slight interchanging of parts the press in this respect may be adapted for use in conjunction with molds of various sizes designed for the production of caskets of correspondingly varying sizes.

In conjunction with the mold chamber supporting platform, the invention has as its object to provide means for accurately centering the mold chamber thereon and for firmly holding this chamber against displacement while it occupies a position upon the said platform.

A still further object of the invention is the construction of the mold chamber supporting platform so that the same may be adapted for coaction with the separable bottom sections of molds of various sizes.

Another object of the invention is the provision of means whereby the effective stroke of the core supporting plunger head may be lengthened or shortened so as to adapt the press for coöperation with molds of various sizes.

In the accompanying drawings:

Figure 1 is a view in side elevation of the mold press embodying the present invention, the view also illustrating in a general manner a glass furnace from which the molten glass is to be drawn into the mold chamber, and a traveling crane or carrier which is to be employed in carrying away from the press the molded casket bodies or lids as the case may be;

Fig. 2 is a vertical longitudinal sectional view through the intermediate portion of the press, the core supporting plunger head being shown in lowered position and the mold chamber supporting platform being shown in position for the carrying out of the pressing operation;

Fig. 3 is a detail vertical longitudinal sectional view through the lower portion of the core supporting plunger head and illustrating in section also the mold chamber, the core, and the cap ring;

Fig. 4 is a view taken substantially on the line 4—4 of Fig. 1, looking in a downward direction;

Fig. 5 is a vertical transverse sectional view taken substantially on the line 5—5 of Fig. 2 and illustrating the parts in the same position as shown in the said Fig. 2;

Fig. 6 is a vertical longitudinal sectional view through the mold chamber supporting platform and illustrating partly in section and partly in elevation the means provided for ejecting the completed article from the mold chamber;

Fig. 7 is a detail horizontal sectional view through the valve provided for controlling the supply of fluid under pressure to the cylinder of the press.

Fig. 8 is a detail vertical sectional view illustrating a modified means for adjusting the supporting casting for the cylinder of the machine;

Fig. 9 is a detail view partly in elevation and partly in vertical section illustrating a modified means for holding the carriage of the machine in position beneath the plunger of the press.

The bed of the press comprises a base which is indicated in general by the numeral 1 and which is preferably in the nature of a substantially hollow and yet heavy and substantial casting having a flat top indicated by the numeral 2. As it is desirable that the top of the base 1 should be level, suitable leveling devices 3 are provided at the four corners of the casting comprising the base and may be adjusted in order to properly position the base. Each of these leveling devices comprises a head 4 which is threaded on to a post 5 which projects downwardly from the respective corner of the casting, the members 4 being designed, of course, to engage the floor surface upon which the press as a whole is arranged. At this point it may be stated that the base 1 is of such dimensions that its top 2 will serve as a rest for the entire mold chamber supporting platform heretofore referred to so that when the platform is in position resting upon the top of the base, all portions of the said platform will be afforded firm support. In addition to the base 1, the bed of the press includes a pair of relatively short supporting uprights 6 located beyond the forward end of the said base, and a similar pair of uprights 7 located rearwardly beyond the said base. Longitudinal parallel beams 8 are supported at their intermediate portions in depressed portions 9 formed in the top of the base 1, and at their ends rest upon and are supported by the uprights 6 and 7. Each of these beams includes an upstanding flange 10 and the said flanges 10 constitute the rails upon which the wheels supporting the mold platform may travel in the shifting movement of the platform above the bed.

The mold chamber supporting platform above mentioned is indicated in general by the numeral 11, and said platform comprises a flat top 12 upon which the bottom of the mold chamber is to be disposed, and depending marginal side flanges 13 and depending marginal end flanges 14, there being, if desired, a number of transverse or longitudinal reinforcing ribs 15 cast integral with the under side of the top and serving to strengthen the same. Shafts 16 and 17 are mounted for oscillatory movement in suitable bearings 18 upon the side flanges 13 of the platform and extend transversely of the platform beneath the top 12 thereof. The said shafts are provided at their opposite ends with eccentrically positioned spindles 19 upon which are journaled wheels 20 which are grooved to travel upon rails 10, it being understood that there are two of the wheels located at each side of the platform and that the platform when carried by the wheels and their axles may be caused to travel over the rails from one end to the other of the bed of the press. Initially the axles 16 are so positioned that the eccentric spindles of the axles will be correspondingly positioned and this relationship of the parts is maintained by securing crank arms 21 and 22 to the ends of corresponding spindles of the axles at one side of the platform and connecting the ends of the said crank arms by means of a connecting bar 23 pivoted at its ends to the said arms. A hand lever 24 is secured to the other spindle of one of the axles, and preferably that one located at the forward end of the platform, and this lever may be manually swung so as to impart corresponding rotary motion to the axles 16 and 17 for the purpose of so adjusting the spindles as to provide for support of the platform by the wheels 20 or to permit of the platform being lowered bodily on to the top of the base 1. If desired, a shorter hand lever 25 may be secured to the remaining spindle so that if two workmen are attending the press, one may assist the other in elevating or lowering the platform. It will now be understood that when the hand lever 24 has been rocked to one of its positions, the wheels 20 will support the platform 11 for travel longitudinally of the bed of the press so that it may be brought to position substantially at the rear end of the press to permit of molten glass being discharged from the glass furnace which is indicated in the drawings in general by the numeral 26, and as it constitutes no part of the present invention need not be specifically described, or the platform may be brought to position above the base 1 of the bed of the press and lowered into position resting upon the top of the said base, as clearly shown in Figs. 2 and 5 of the drawings. Also the platform may be moved to position substantially at the forward end of the bed of the press to permit of the molded body or lid of the casket being elevated by a traveling crane, indicated in general by the numeral 27, and by the means of which crane the said body or lid of the casket may be transferred from the mold to the annealing oven.

Means which will now be described, is provided for causing travel of the platform along the bed of the press. This means includes a sprocket chain 28 connected at its ends as at 29 and 30 respectively to the front and rear portions of the platform 11 beneath the top 12 of the latter. The chain 28 passes over an idle sprocket gear 31 carried by a shaft 32 rotatably mounted in suitable bearings 33 upon the uprights or pedestals 6. After passing from the forward end of the platform 11 over the idle sprocket gear 31 the lower stretch of the chain is led rearwardly beneath the top of the base 1 through suitable openings 34 formed in the said base. The chain then passes around a sprocket gear 35 which is fixed upon a shaft 36 journaled in suitable bearings 37 upon the rear uprights or pedestals 7 of the bed of the press. One of the said uprights 7 is provided with an upward extension 38 in the upper end of which is journaled a shaft 39 having fixed upon its inner end a sprocket gear 40 and upon its outer end a crank handle 41. A sprocket chain 42 is passed over the gear 40 and over a similar gear 43 fixed upon the shaft 36. It will now be understood that by rotating the shaft 39 through the medium of the crank handle 41, rotary motion will be imparted to the shaft 36 and the chain will be caused to travel in one direction or the other serving to impart corresponding movement to the mold chamber supporting platform along the bed of the press. Chocks 44 are arranged upon the rails 10 near the rear ends of the said rails and in the path of movement of the rear end of the platform 11 for the purpose of limiting the rearward travel of the said platform, and similar chocks 45 are arranged upon the said rails substantially at the forward ends thereof to limit the forward travel of the said platform. Thus in order to determine when the platform has reached a proper position to receive molten glass from the furnace 26 or to permit of the completed article being lifted and carried off by the crane 27, it is only necessary for the operator of the press to rotate the crank handle 41 in the proper direction until the platform has in the first instance engaged the chocks 44 or in the latter instance engaged the chocks 45.

In order to center the platform 11 and hold the same stationary or against displacement while in position for the carrying out of the pressing operation, adjustable chocks are provided at the ends of the base 1. The chock at the forward end of the said base is indicated in general by the numeral 46 and the one at the rear end is indicated in general by the numeral 47. These chocks are mounted respectively upon shafts 48 and 49 and each comprises a head 50 and a crank arm 51. The heads 50 of the chocks have arcuate engaging faces concentric to the respective shafts 48 and 49, and these faces are designed to bear against beveled faces 52 at the lower edges of the flanges 14 at the front and rear ends of the platform. A connecting rod 53 is pivotally connected as at 54 to the arm 51 of the chock 46 and is led rearwardly beneath the top of the base 1 and pivotally connected as at 55 with the lower end of a hand lever 56 mounted for rocking movement upon a shaft 57 extending transversely of the rear end of the bed of the press and preferably adjacent the shaft 36. A similar connecting rod 58 is connected as at 59 to the arm 51 of the chock 47 and is also led rearwardly and pivotally connected at its rear end as at 60 to the lower end of a hand lever 61 also mounted upon the shaft 57. It will now be understood that by swinging the levers 56 and 61 respectively forwardly and rearwardly, the respective chocks 46 and 47 will be swung upwardly to the position shown in Fig. 2 of the drawings, in which position the chocks will respectively engage against the beveled faces 52 at the front and rear ends of the platform 11 thus securely holding the platform against displacement longitudinally of the bed of the press. Of course, after the pressing operation has been completed and it is desired to shift the platform to position where the completed article may be ejected from the mold chamber, the levers 56 and 61 will be swung in the opposite directions so as to cause downward swinging of the heads of the chocks 46 and 47 until they clear the front and rear ends respectively of the platform 11. As the chock heads 50 have arcuate faces which are concentric to the shafts 48 and 49, the platform 11 will have been accurately positioned for the carrying out of the pressing operation when the said faces of both chock heads are in engagement against the ends of the platform 11. Therefore, although the levers 56 and 61, and the crank handle 41 are located at the extreme rear end of the bed of the press, the workmen attending the operation of these parts may readily center or position the platform without leaving the rear end of the press bed if he will first operate the lever 56 so as to bring the chock 46 into position to act as a stop for the platform, then rotate the crank handle 41 until the platform has been caused to travel forwardly over the rails 10 to position in engagement with the head of the said chock 46, and finally operate the lever 61 to cause the head of the chock 47 to engage the rear end of the platform. In the meantime, of course, another workman will have swung the hand lever 24 to cause lowering of the platform 11 on to the top 2 of the base 1.

As the mold to be acted upon by the press does not constitute in itself a part of the present invention, it will only be herein briefly described. The mold comprises a mold chamber indicated in general by the numeral 62 having a bottom section 63 which is upwardly displaceable to permit of ejection of the molded body or lid of the casket from the said chamber after the molding operation. The core of the mold is indicated in general by the numeral 64, and the cap ring heretofore referred to is indicated by the numeral 65. The walls of the body of the mold chamber 62 are formed at their upper edges with a recess 66 providing a shoulder 67, and the cap ring 65 is provided with a depending rib 68 which is designed to seat within the recess 66, when the said ring is lowered into position upon the top of the mold chamber 62, the lower edge of the rib 68 being designed to rest upon the shoulder 67. The rib 68 is spaced inwardly from the true inner edge of the ring 65 so as to provide an overhanging portion 69 designed to span and close the space between the walls of the mold chamber 62 and the outer surface of the sides and ends of the core 64 when the core is lowered into the mold chamber in the operation of the press.

Returning now to a consideration of the platform 11, the said platform is provided centrally in its top 12 with an opening 70 in which is nested a rectangular frame 71 in turn receiving a head 72 which is designed to support the bottom section 63 of the mold chamber in the operation of ejecting the molded body or lid of the casket from the said chamber, the said section 63 being secured to the head 72 by means of bolts 72'. The frame member 71 is provided at its top at one end with a lug 73 designed to rest in a recess 74 formed in the corresponding end wall of the opening 70. Similar lugs 73' are provided at the opposite corners of the frame member and rest in recesses 74' in the side walls of the opening 70. A lug 75 upon one end of the head 72 and corresponding to the lug 73, seats in a recess 76 in the corresponding end wall of the opening in the frame member 71, and other lugs 75' corresponding to the lugs 73' seat in recesses 76' corresponding to the recesses 74'. Where the casket to be molded is of a relatively small size, both the frame 71 and the head 72 will be employed, but where larger sizes of caskets are to be molded a head corresponding to the head 72 but of dimensions to fit within the opening 70 in the same manner that the frame 71 fits the said opening, will be employed.

In order to positively brace the mold chamber after the same has been properly disposed upon the platform 11 and to hold the same against displacement when the bottom 63 is in elevated position as in the operation of ejecting the completed article from the mold chamber, abutment members are provided upon the top of the platform 11 and are located one adjacent each end of the platform and one or more at each side thereof. Each of these abutment devices comprises a head 79 substantially cylindrical in marginal contour and formed eccentrically with an opening 80 through which is passed a bolt 81 threaded as at 82 into the top 12 of the said platform 11. It will now be understood that having disposed the mold chamber in proper position upon the platform, it is only necessary, in order to secure the same against displacement, to loosen the bolts 81, rotatably adjust all of the heads 79 until the peripheries thereof bind against the outer faces of the walls of the mold chamber at the bottom thereof, and then tighten all of the said bolts 81. In order that the heads 79 may be bodily adjusted toward or from the center of the platform 11 so as to adapt the heads to bind mold chambers of various sizes, it is preferable that a number of threaded openings indicated by the numeral 83, be provided for the reception of each of the bolts 81, these openings being arranged in a series extending in a direction from the center of the platform 11 toward the adjacent side or end of the said platform, and it will be understood, of course, that the bolts 81 are to be selectively fitted into the said openings 83.

The core supporting plunger head is raised and lowered through the medium of a fluid actuated piston and suitable connecting means, and this head and the actuating means therefor will now be described. The numeral 84 indicates vertical standards which upstand from the base 1 at the four corners thereof and the upper end portions of these standards are threaded as indicated by the numeral 85. The numeral 86 indicates a supporting casting for the cylinder in which the piston above mentioned operates and this casting is provided at each of its four corners with a sleeve portion 87, the sleeve portions fitting snugly and yet slidably the respective standards 84 so that the supporting casting 86 may be elevated or lowered in order to vary the downward throw of the core supporting plunger head. If desired the sleeve portions 87 may be split and clamped to the respective standards 84 by means of bolts 88 fitted through ears 89 upon the sleeve portions at the opposite sides of the splits therein. In any event a halved sleeve 90 is clamped by means of bolts 91 upon each standard 84 and serves as a rest for the lower end of the respective sleeve portion 87. It will be understood, of course, that when the supporting casting 86 is to be elevated it will be moved bodily upwardly, the sleeve portions 87 sliding upwardly upon the standards 84, and, of course, when the casting has been elevated to the desired position, the sleeves 90 will be clamped to the respective standards 84 in position engaging the lower ends of the respective sleeve portions 87. In order to prevent upward displacement of the supporting casting 86 when the piston is being forced downwardly in the cylinder, hand nuts 92 are adjustably fitted on to the threaded upper ends of the standards 84 and may be rotated so as to bind firmly against the upper ends of the sleeve portions 87 of the said casting and in this manner prevent upward sliding movement of the sleeve portions upon their respective standards for the purpose stated.

The core supporting plunger head is indicated in general by the numeral 93 and will presently be more specifically described. This head is provided at each of its four corners with sleeve portions 94 which slidably fit the respective standards 84 so that the plunger head is guided in its raising and lowering movements and prevented from lateral displacement. The fluid pressure cylinder heretofore mentioned is indicated by the numeral 95, and working therein is a piston head 96, the rod 97 of which is slidably fitted through a stuffing box 98 at the lower head of the cylinder 95. As will be observed by reference to Figs. 2 and 5 of the drawings, the cylinder 95 is secured at its lower head or end upon the top of the supporting casting 86, the stuffing box 98 preferably fitting through an opening 99 in the said top of the casting, and the piston rod 97 extending downwardly through the casting, which latter may be of hollow construction illustrated in the drawings or of any other suitable construction. The head 93 is provided centrally with a socket 100 which opens through its top, and the lower end of the piston rod 97 works slidably in the said socket 100, as clearly shown in Fig. 2 of the drawings. Thus the reciprocation of the piston head 96 in the cylinder 95 does not directly affect the core supporting plunger head 93, other means being provided for transmitting motion and power to the said head 93. The means just referred to comprises two sets of toggle links, the upper links 101 of each set being pivoted at their upper ends as at 102 within the supporting casting 86. Each toggle embodies two of the links 101 as will be apparent by reference to Fig. 5, these links being disposed at the opposite sides of the upper end of the lower link of the toggle, which latter link is indicated by the numeral 103. A pivot pin 104 is passed through the lower ends of the links 101 and the upper end of the link 103, and the said links 103 are pivoted at their lower ends as at 105 to the upper side of the core supporting plunger head 93. The upper ends of the toggle links 103 embody spaced portions 106 connected with the pivot pin 104, and between which portions the intermediate portion of the said pin extends, as will be clear by reference to Fig. 5 of the drawings. Thrust links 107 are pivoted at their outer ends to the said intermediate portion of the pivot pins 104, and at their inner ends these links are pivotally connected, as indicated by the numeral 108, to a head 109 which is split and clamped by means of bolts 110 to the piston rod 97, the head being, of course, adjustable upon the said rod. At this point it will be understood that when the piston 96 is forced upwardly through air, steam, or other fluid under pressure acting against its under side, the corresponding upward movement of the head 109 will result in the toggle joints being broken and the core supporting plunger head 93 being elevated. On the other hand when the piston 96 is forced downwardly by fluid pressure, the head 109 will be correspondingly moved causing the thrust links 107 to act against the toggles to move the core supporting plunger head downwardly with great force.

A supply pipe 111 leads into the cylinder 95 through the upper head thereof, and a supply pipe 112 leads into the cylinder through the bottom head thereof. These pipes serve also as outlet or exhaust pipes, as will be presently pointed out. The numeral 113 indicates a main supply pipe for the fluid under pressure which may be compressed air drawn from a suitable source, or steam, and interposed in this pipe at a convenient point is a cut-off valve 114 by closing which the supply may be completely cut off. The pipe 113 leads to a valve casing 115 in which is rotatably mounted a valve head 116 having a receiving recess 117 formed therein. Passages 118 and 119 establish communication between the recess 117 and ports 120 and 121, respectively, which ports open through the periphery of the valve head 116 and are adapted to be, in the rotation of the head, brought selectively into registration with the intake ends of the pipes 111 and 112 respectively. Of course, when the head 116 of the valve has been rotated as for example through the operation of a hand lever 122 connected with the stem of the valve which is indicated by the numeral 123 and extends from the head 116 axially through the top of the casing 115, so that the port 120 is in registration with the pipe 111, the fluid under pressure will be supplied through this pipe to the upper end of the cylinder 95 to force the piston head 96 in a downward direction. On the other hand when the valve head 116 has been rotated so as to bring the port 121 into registration with the pipe 112, the fluid under pressure will be supplied to the lower end of the cylinder to cause upward movement of the piston. As before stated, the pipes 111 and 112 are to serve also as outlet or vent pipes so that when the fluid under pressure is admitted to one end of the cylinder, it will be exhausted from the other end. With this object in view the casing 115 is formed with a vent opening 124, and the valve head 116 is formed with a vent passage 125 having branches 126 and 127 which are so arranged that when the port 120 is in registration with the pipe 111, the branch 127 of the vent passage will be in registration with the pipe 112 and on the other hand when the port 121 is in registration with the pipe 112, the branch 126 of the vent passage will be in registration with the pipe 111. The passage at its end next adjacent the vent opening 124 is greatly increased in width so that it will at all times register with the said vent opening.

It will be observed by reference to Figs. 2, 3 and 5 of the drawings that the core 64 of the mold is bolted at its top to the under side of the plunger head 93 as indicated by the numeral 128 so that the said core is bodily movable with the said head. The cap ring of the mold is also bodily movable with the plunger head 93 but is yieldably supported thereupon so that even after the said cap ring has been brought to position upon the top of the mold chamber 62, the plunger head 93 can have further downward movement to cause the core 64 to enter the mold chamber, such movement in no way affecting the disposition of the said cap ring. In supporting the cap ring 65, means is provided which will now be described. The numeral 129 indicates in general a frame provided at suitable intervals with openings 130 which slidably receive threaded supporting rods 131 which extend upwardly from the top of the plunger head 93 and are rigid with respect thereto, these rods at their lower ends being preferably threaded into suitable sockets formed in the top of the plunger head 93, as indicated by the numeral 132. Nuts 133 and 134 are threaded on to each of the rods 131 and may be tightened to bear, respectively, against the upper and under sides of the frame 129. Thus the frame may be vertically adjusted and secured in any desired position of adjustment. Rods 135 are secured at their lower ends as at 136 to a frame 137 the purpose of which will be presently pointed out, and springs 138 are fitted to the said rods 135 and bear at their lower ends against the upper side of the frame 137 and at their upper ends against the lower ends of sleeves 139 which fit the upper portions of the rods 135 and through which the rods are slidable. At their upper ends the sleeves 139 fit against the under side of the frame 129, the rods 135, however, passing upwardly through openings in the said frame 129 and having fitted to their upper ends nuts indicated by the numeral 140. The frame 137 is formed at suitable intervals with bolt openings 141 through which are passed bolts 142 which serve to removably secure to the under side of the said frame 137, a reducing frame 143 to which in turn is bolted, as at 144, the cap ring 65 heretofore referred to as comprising a part of the mold. The dimensions of the cap ring 65 will, of course, vary in accordance with the variations in size of the casket bodies or lids to be molded and it will, therefore, be understood that where a wider and longer cap ring is to be employed than illustrated in the drawings, the reducing or adapting frame 143 will be correspondingly narrowed at its sides and ends, and on the other hand where a smaller cap ring is to be employed, the sides and ends of the adapter frame 143 will be correspondingly widened. Of course, if an extra large cap ring is to be employed, the reducing or adapting frame 143 may be dispensed with and the cap ring 65 may be secured directly to the frame 137 by the bolts 142.

From the foregoing description it will be understood that by means of the valve shown in Fig. 7 of the drawings, the up and down movement of the plunger head 93 may be controlled by the operator of the press and that in the downward stroke of the said plunger head in the act of forcing the core 64 downwardly into the mold chamber 62, the frame 137 will be carried downwardly with the plunger head 93 until the cap ring 65 rests upon the top of the mold chamber, as clearly shown in Figs. 2 and 5 of the drawings, whereupon the downward movement of the said ring will be, of course, arrested. The plunger head 93 will, however, continue in its downward movement, the springs 138 being compressed as the frame 129 lowers upon the rods 135. Of course, prior to the operation above described the operator will have shifted the platform 11 to the position shown in Fig. 1 of the drawings, to charge the mold chamber with molten glass. As before stated, the cap ring 65 is designed to close the space between the upper edges of the side and end walls of the mold chamber 62 and the corresponding sides and ends of the core 64. Therefore, as the core lowers through the cap ring 65 the molten glass within the mold will be caused to rise in the mold chamber and, the quantity of molten glass having been accurately determined, the level of the molten glass will finally reach the cap ring 65 to mold the upper edges of the side and end walls of the body or the lower edges of the side and end walls of the lid as the case may be. Of course, after the pressing operation has been completed, the plunger head 93 will be caused to rise carrying with it the core 64 and after the core has been completely withdrawn from the mold chamber 62, and the nuts at the upper ends of the rods 135 have been brought into contact with the frame 129, the rods 135 will then act to elevate the frame 137, the adapting frame 143, and the said cap ring 65. Subsequent to this operation the platform 11 with the mold chamber 62 thereon and the molded body or lid of the casket in said chamber, is to be moved along the bed of the press to position for ejection.

The ejecting means referred to above is most clearly shown in Fig. 6 of the drawings, and the same comprises a head 145 which is fixed at the upper end of a piston 146 working in a cylinder 147 to which fluid under pressure may be admitted through a branch 148 from the main supply pipe 113. The cylinder 147 is mounted beneath the bed of the press as clearly shown in Fig. 1 of the drawings, and in such position adjacent the forward end of the said bed as to coact with the head 72 upon the platform 11 when the mold chamber is directly beneath the crane 27. The head 72 is preferably formed in its under side with sockets 149 and the head 145 is provided upon its upper face with studs 150 which are designed to engage in the said sockets 149 for the purpose of preventing relative displacement of the parts as the head 145 is elevated through the admission of fluid under pressure to the cylinder 147 and the molded article is ejected from the said mold chamber.

As the core of the mold is in elevated position at the time of introduction of the molten glass into the mold chamber, the mold chamber will, of course, become heated while the core remains relatively cool, and it is therefore desirable that means be provided for heating the core so that the same will have substantially the same degree of temperature as the mold chamber. In order that this may be accomplished openings 67' are provided in the side and end walls of the said core and burner nozzles of any suitable type, indicated by the numeral 151, are fitted through the said openings so that the flames from the burners will play within the hollow core and suitably heat the same, as stated.

In the drawings and in the foregoing description, the cap ring 65 is illustrated and described as secured by the bolts 144 to the member 143. However, I may find it desirable to leave the said cap member disconnected from the member 143 in order that the cap member may be heated prior to being placed upon the top of the mold chamber, it being understood that in any event, upon downward movement of the plunger of the press, pressure will be exerted against the said cap ring by the member 143 or any similarly or suitably constructed member substituted therefor.

In Figs. 1, 2 and 5 of the drawings, the casting 86 for supporting the cylinder 95 is supported in positions of adjustment upon the uprights 84, by means of the sleeve or collar members 90, but it may be desirable to substitute for these members 90 a hand nut 92', as shown in Fig. 8 of the drawings, this nut being complemental to the nut 92 which bears against the upper end of the respective sleeve portions 87 of the casting. Thus in the modified structure, which is clearly shown in Fig. 8 of the drawings, one or the other of the hand nuts may be loosened and the other nut then adjusted so as to suitably raise or lower the casting 86.

As illustrated in Figs. 2 and 4 of the drawings and as briefly explained, the carriage 11 is adapted to be held in true centered position, beneath the plunger of the press by the engagement of the cam abutment members 46 and 47 with the opposite ends of the carriage. However, for this means there may be substituted the means shown in Fig. 9 of the drawings, in which figure the bed of the press is indicated by the numeral 152, and the carriage by the numeral 153. The carriage is provided with the keeper plate 154 having a horizontal outstanding portion 155 provided with an opening 156. A locking device coacts with this keeper plate and includes a lever 157 pivotally mounted as at 158 at one side of the bed of the press and extending transversely of the said bed, the lever being provided at its opposite end with a foot pedal 159 whereby it may be depressed. A suitable guide 160 is secured upon one end of the bed 152 and slidably mounted in this guide is a locking pin 161 the upper end of which is designed to project into the opening 156 in the keeper plate for the purpose of holding the carriage 153 against travel after it has been brought to the proper position of adjustment. At its lower end the locking pin is pivotally connected as at 162 with the foot lever 157, and a spring 163 is fitted on to the locking pin and bears at its lower end against one of the spaced portions of the guide 160 and at its upper end against a stop collar or the like 164 fixed upon the said pin. The spring, of course, serves to normally hold the locking pin in elevated position and when the carriage is beneath the plunger of the press, the upper end of the pin will project into the opening 156 as stated, for the purpose of holding the carriage against displacement. When it is desired to release the carriage it is only necessary to press downwardly upon the foot pedal 159 whereupon the pin will be retracted from the opening in the keeper plate.

Having thus described the invention, what is claimed as new is:

1. In a mold press, a bed, a mold chamber supporting platform movable along the bed to a position beneath the press, a core supporting plunger operating above a portion of the bed and movable downwardly within the mold chamber, means for holding the platform on the bed beneath the plunger during the pressing operation, means at one side of the said plunger for discharging material in a plastic state into the mold chamber, and fluid pressure means at the other side of the plunger for ejecting the molded article from the mold chamber.

2. In a mold press, a bed, a mold chamber supporting platform movable along the bed to a position beneath the press, means engaging said platform for holding it on the bed beneath said press during the pressing operation, spaced rotary gear elements, a flexible gear element connected with the said platform and passed about the rotary gear elements, means for rotating one of said rotary gear elements, means disposed at one side of the press for feeding material in a plastic state into the mold chamber, and fluid pressure means at the other side of the press for ejecting the molded article from said mold chamber.

3. In a mold press, a bed including spaced rails, a mold chamber supporting platform, wheels carried thereby and traveling upon said rails, rotary gear elements located substantially at the ends of the rails, a flexible gear element connected to the platform and trained about the rotary gear elements, a crank handle operatively geared with one of said rotary gear elements, and means whereby the platform may be raised and lowered with relation to the rails and to permit of said platform being lowered to a position upon the bed.

4. In a mold press, a bed including rails, a mold chamber supporting platform movable on the rails toward either end of the bed, means for arresting the movement of the platform when the same has reached a predetermined point in its movement toward either end of the bed, a core supporting plunger operating above the intermediate portion of the bed, means for preventing movement of the platform when the same is in position beneath the plunger, and means for raising and lowering the platform with relation to the rails and to permit said platform to rest on the bed.

5. In a mold press, a bed including rails, a core supporting plunger head mounted above the bed, means for raising and lowering the plunger head, a mold supporting platform shiftably mounted upon the rails toward either end of the bed, means for shifting the said platform, the platform embodying an upwardly removable section, and ejector means operating displaced with relation to the plunger head and arranged for coöperation with the said section of the platform when the platform is in one of its shifted positions, and means whereby the platform may be raised and lowered with relation to the rails and to permit of the platform being lowered to a position on the bed beneath the plunger head.

6. In a mold press, a bed including rails, a core supporting plunger head mounted above the bed, means for raising and lowering the said plunger head, a mold supporting platform shiftably mounted upon the rails, means for raising and lowering the platform with relation to the rails and to permit the platform to rest on the bed beneath the plunger head, an ejecting section normally seated within the platform, a vertically movable member, and means carried thereby for coöperation with the said section to elevate the same when the platform is in position above the last-mentioned means.

7. In a mold press, a bed including rails, a mold chamber supporting platform mounted for movement on the rails and movable to a position beneath the press, the platform having an upwardly movable section designed to coöperate with the removable bottom of a mold chamber when said chamber is disposed upon the platform, means whereby the platform may be raised and lowered with respect to the rails and to permit said platform to rest directly on the bed, and ejector means including an upwardly movable member for coöperation with the upwardly movable section of the platform.

8. In a mold press, a bed, a supporting platform mounted for movement upon the bed, a mold supported on the platform and having a removable bottom, adjustable means for centering the mold on the platform, the platform having an upwardly movable section designed to coöperate with the removable bottom of the mold, ejector means including an upwardly movable member for coöperation with the upwardly movable section of the platform, and coacting means upon the said section of the platform and the said member of the ejector means for preventing relative displacement of the said section and member.

9. In a mold press, a mold chamber supporting platform, and means carried thereby and adjustable to center the mold chamber on said platform, the said means comprising bolts threaded into the upper surface of the platform, and heads eccentrically rotatably fitted to the bolts and engaging the exterior walls of the mold chamber.

10. In a mold press, a mold chamber supporting platform, and means for centering the mold chamber upon the platform including oppositely located bolts threaded into the upper surface of the platform, and substantially circular heads eccentrically rotatably fitted to the bolts and bearing against the adjacent exterior walls of the mold chamber.

11. In a mold press, a mold chamber supporting platform, and means thereon for preventing displacement of the chamber, the said platform being formed at spaced points with series of openings arranged at an angle to each other, bolts designed to be selectively fitted into said openings, and a head eccentrically rotatably mounted upon each of the said bolts for engagement with the adjacent wall of the mold chamber.

12. In a mold press, a bed including rails, a mold chamber supporting platform, spindles, eccentrically movable means supporting the spindles, wheels upon the spindles, and means for actuating the eccentrically movable means to raise and lower the platform with relation to the rails.

13. In a mold press, a bed including spaced rails and a base, a mold chamber supporting platform, axles rotatably adjustably mounted upon the platform and having eccentric spindles, wheels journaled upon the spindles, and means for rotatably adjusting the said axles.

14. In a mold press, a bed including spaced rails and a base, a mold chamber supporting platform, axles rotatably adjustably mounted upon the platform and having eccentric spindles, wheels journaled upon the spindles, crank arms connected with the corresponding ends of the spindles, connecting means between the crank arms, and a hand lever connected with another one of the spindles.

15. In a mold press, a bed, a mold chamber supporting platform, means supporting the platform for travel along the bed, means whereby the platform may be raised and lowered with relation to the bed and to permit said platform to rest directly on the bed beneath the press, and means for holding the platform against longitudinal movement when the latter is in lowered position beneath the press.

16. In a mold press, a bed, angularly adjustable chocks pivotally mounted at the opposite ends of the bed, means for angularly adjusting the said chocks, and a mold chamber supporting platform movable along the bed to a position beneath the press arranged to lie between and be engaged by said chocks.

17. In a mold press, a bed, angularly adjustable chocks pivotally mounted at the opposite ends of the bed and having opposed arcuate faces, a mold chamber supporting platform movable along the bed and adapted to occupy a position lying between the chocks and when in such position to have opposite portions engaged by the said faces of the chocks, and means for angularly adjusting the chocks.

18. In a mold press, a bed, angularly adjustable chocks pivotally mounted on the opposite ends of the bed and having opposed arcuate faces, a mold chamber supporting platform movable along the bed and adapted to occupy a position lying between the chocks and when in such position to have opposite portions engaged by the said faces of the chocks, the said means comprising operating levers, and connecting elements extending between the levers and the chocks.

19. In a mold press, a bed including spaced rails and a supporting base located between the rails, a mold chamber supporting platform having wheels traveling upon the rails, means whereby the platform may be raised and lowered with relation to the rails and to permit of the same being lowered to position upon the supporting base, and adjustable chocks at the opposite sides of the base for coaction with the platform to restrain the same against displacement.

20. In a mold press, a mold chamber supporting platform, a core supporting plunger guided for up and down movement above the platform and movable to a position within the mold chamber through the top thereof, a vertically adjustable supporting member, a reciprocating power element carried by the vertically adjustable member, toggles connected with the vertically adjustable member and with the plunger, and thrust links connected with the toggles and with the reciprocating power element.

21. In a mold press, a mold chamber supporting member, a core supporting plunger operating above the member, a frame having an inwardly extending attaching flange, means yieldably supporting the frame with relation to the plunger, the said frame being arranged to surround a core carried by the said plunger, and a secondary reducing frame detachably secured to the flange of the first-mentioned frame and arranged for the support of a mold cap member.

22. In a mold press, a mold chamber supporting member, a core supporting plunger coacting with the mold chamber supporting member, a frame disposed above the plunger, threaded rods forming an adjustable connection between the frame and plunger, said frame being provided with spaced openings, nuts engaging the threads on the rods above and below the frame, a cap ring arranged beneath the plunger, rods connected with the cap ring and having their upper ends extended through the openings in the frame and provided with heads, and coil springs surrounding the rods for exerting downward pressure upon the cap ring and holding said cap ring in position on the top of the mold chamber during the passage of the core through said ring into the mold chamber.

In testimony whereof I affix my signature.

WILLIAM J. MILLER. [L. S.]